(12) United States Patent
Duval

(10) Patent No.: US 7,377,186 B2
(45) Date of Patent: May 27, 2008

(54) ENGAGEMENT OF A SENSOR SYSTEM WITH A VEHICLE OPERATING DEVICE

(75) Inventor: Landon Duval, Huntington Beach, CA (US)

(73) Assignee: Transbiotec, Inc., Irvine, CA (US)

( * ) Notice: Subject to any disclaimer, the term of this patent is extended or adjusted under 35 U.S.C. 154(b) by 191 days.

(21) Appl. No.: 11/100,960

(22) Filed: Apr. 6, 2005

(65) Prior Publication Data

US 2006/0016244 A1 Jan. 26, 2006

Related U.S. Application Data

(63) Continuation-in-part of application No. 10/899,826, filed on Jul. 26, 2004, now abandoned.

(51) Int. Cl.
*G01N 1/00* (2006.01)

(52) U.S. Cl. ..................... 73/863.01; 73/23.2

(58) Field of Classification Search ............ None
See application file for complete search history.

(56) References Cited

U.S. PATENT DOCUMENTS

| | | | |
|---|---|---|---|
| 3,818,434 A * | 6/1974 | Gotoh et al. ............... | 180/272 |
| 4,090,078 A | 5/1978 | Heim | |
| 4,277,251 A | 7/1981 | Leichnitz | |
| 4,363,635 A | 12/1982 | Hutson | |
| 4,613,845 A * | 9/1986 | Du Bois ..................... | 340/576 |
| 4,649,027 A | 3/1987 | Talbot | |
| 4,749,553 A | 6/1988 | Lopez et al. | |
| 4,849,180 A | 7/1989 | Fukui | |
| 4,905,498 A | 3/1990 | O'Donnell et al. | |
| 5,055,268 A | 10/1991 | Martin | |
| 5,086,229 A | 2/1992 | Rosenthal et al. | |
| 5,220,919 A | 6/1993 | Phillips | |
| 5,313,941 A | 5/1994 | Braig et al. | |
| 5,361,758 A | 11/1994 | Hall et al. | |
| 5,376,555 A | 12/1994 | Forrester et al. | |
| 5,429,128 A | 7/1995 | Cadell et al. | |
| 5,743,349 A | 4/1998 | Steinberg | |
| 5,944,661 A * | 8/1999 | Swette et al. ............... | 600/345 |
| 6,064,898 A | 5/2000 | Aldrich | |
| 6,075,444 A * | 6/2000 | Sohege et al. .............. | 340/576 |

(Continued)

OTHER PUBLICATIONS

U.S. Appl. No. 10/899,826, filed Jul. 26, 2004, Duval.

*Primary Examiner*—Robert Raevis
(74) *Attorney, Agent, or Firm*—Gene Scott; Patent Law & Venture Group

(57) ABSTRACT

A steering wheel has a structural skeleton forming a core within an outer covering, the covering and skeleton forming a hub portion having at least one arm interconnecting the hub portion with an outer wheel portion. The skeleton within the outer wheel portion has a U-shaped cross sectional conformation. A wire harness is positioned within the U-shaped conformation of the outer wheel portion and a plurality of ethanol detectors are mounted in spaced apart relationship within the outer wheel portion and adjacent to an outer surface of the steering wheel. The ethanol detectors communicate with the wire harness and an electrical circuit, the circuit engaging the hub portion of the skeleton. The circuit is in communication with the wire harness for receiving electrical signals from the ethanol detectors for sensing ethanol vapors in proximity to at least one of the ethanol detectors.

6 Claims, 4 Drawing Sheets

U.S. PATENT DOCUMENTS

| | | |
|---|---|---|
| 6,097,480 A | 8/2000 | Kaplan |
| 6,167,290 A | 12/2000 | Yang et al. |
| 6,183,418 B1 | 2/2001 | Kuennecke |
| 6,229,908 B1 | 5/2001 | Edmonds, III et al. |
| 6,614,920 B2 | 9/2003 | Floyd |
| 6,620,108 B2 * | 9/2003 | Duval et al. ................ 600/532 |
| 2003/0120137 A1 | 6/2003 | Pawluczyk |
| 2005/0087382 A1 * | 4/2005 | Bellehumeur ............... 180/272 |
| 2005/0230175 A1 * | 10/2005 | Brown et al. ............... 180/272 |
| 2006/0044144 A1 * | 3/2006 | Duval ....................... 340/576 |

* cited by examiner

ENGAGEMENT OF A SENSOR SYSTEM WITH A VEHICLE OPERATING DEVICE

RELATED APPLICATIONS

This application is a Continuation-In-Part Application of a prior filed application having Ser. No. 10/899,826 and filing date of Jul. 26, 2004 now abandoned and entitled: Steering Wheel Vapor Collection and Sensing System Using Suction. This application is also related to a United States application with Ser. No. 10/917,694 with filing date of Aug. 12, 2004 entitled: Steering Wheel Vapor Collection and Sensing System Using a Chemical Element, and also to United States application with Ser. No. 10/928,328 with filing date of Aug. 28, 2004 entitled: Substance Detection and Alarm Using a Spectrometer Built Into a Steering wheel Assembly.

BACKGROUND OF THE INVENTION

1. Field of the Invention

This invention relates generally to the installation of a detection system within a steering wheel of a vehicle and more particularly to an integrated signal system using solid state vapor sensors for controlling the use of the vehicle.

2. Description of Related Art

The following art defines the present state of this field and each disclosure is hereby incorporated herein by reference:

Heim, U.S. Pat. No. 4,090,078 describes a method for determining the alcohol content in the exhaling respiratory air using an alcohol measuring instrument and measuring the alcohol content when the exhaling air transmits the determined value of the alcohol concentration. This determined value of alcohol concentration occurs when the time variation related to the height of the alcohol signal is below a predetermined threshold value and the velocity of flow of the exhaling air is above a given value and is maintained without interruption for a given time. The apparatus includes an infrared measuring instrument which is connected into the respiratory air current and measures the alcohol concentration of the exhaling air. This value is applied to an indicator through a linear gate when an AND-gate is triggered by threshold comparators and a timing element activated by a threshold comparator.

Leichnitz, U.S. Pat. No. 4,277,251 describes a method of determining the alcohol content of air exhaled by a person using a flow through testing tube having an alcohol indicating material therein and a sampling tube to which the air is directed which has a material therein for retaining the alcohol of the breathing air and also using a suction pump comprises cooling the sampling tube, passing the exhaled air through the cooled sampling tube, measuring a volume of the air passing through the cooled sampling tube, heating the sampling tube and connecting the suction pump to the sampling tube to suck flushing air through the heated tube and then through the testing tube. The sampling tube advantageously contains a silica gel to retain the alcohol therein. The volume measuring device may be a measuring bag.

Hutson, U.S. Pat. No. 4,363,635 describes a method and apparatus for discriminating between alcohol and acetone in a breath sample and accurately measuring the alcohol level when acetone is present in the sample. The breath sample is measured with two different types of detectors and their outputs compared. One detector uses the principles of infrared (IR) absorption, the other detector is a semiconductor, commonly called a Taguci cell, or its equivalent. Automatic correction is provided for variations in sensitivity of the semiconductor.

Talbot, U.S. Pat. No. 4,649,027 describes a battery-operated portable breath tester. The breath tester includes a housing which defines a sleeve for receiving a wand. The wand defines an internal sample chamber, with a lamp at one end for providing infrared energy and a detector at an opposite end for receiving the infrared energy after it has passed through the sample to be tested. The wand defines opening extending from the internal sample chamber to the outside of the wand. The wand has an external shape providing a snug fit within the sleeve. As the wand is moved within the sleeve, gas is purged from the wand. The wand is connected to the housing by means of an electrical coil. The housing encloses a digital voltmeter including a digital display for providing a test readout. The digital voltmeter includes an oscillator which is coupled through a frequency divider and a transistor switch to the lamp. The lamp is switched on and off in accordance with the frequency output of the frequency divider to modulate the infrared energy emitted from the lamp at a selected frequency. A voltage regulator is connected to the lamp, and the lamp and voltage regulator are located in heat-exchange relationship with the sample chamber. This aids in raising the temperature of the sample chamber during testing in order to alleviate condensation.

Lopez, U.S. Pat. No. 4,749,553 describes a breath alcohol detector measuring and compensating for distance between the mouth of the individual exhaling breath into the ambient air and the detector, the atmospheric pressure, and the temperature. Blood alcohol content information is calculated using these compensation factors and a signal obtained from an electrochemical fuel cell which is indicative of the amount of alcohol or other gas contained in the sample. The detector also includes a reciprocally acting electromagnetically energized motor which drives a diaphragm pump to draw the sample into the electrochemical fuel cell.

Fukui, U.S. Pat. No. 4,849,180 describes an alcohol selective gas sensor including a detecting electrode and a semiconductor detecting element in contact with the detecting electrode, the semiconductor detecting element comprising tin oxide ($SnO_2$) and a metal oxide of at least one of alkaline earth metals (Be, Mg, Ca, Sr, Ba) carried by the tin oxide, the metal oxide being contained in an amount of about 0.5 mol % or above.

O'Donnell et al., U.S. Pat. No. 4,905,498 describes a gaseous detection system for detecting the existence of a certain gas and further the detection of a certain level or percentage of that certain gas within a certain environment. An example is use of the gas detection system in a motor vehicle to aid in determining when a driver of the motor vehicle may be driving under the influence of alcohol, and for providing an appropriate warning signal that may be viewed from the exterior of the motor vehicle. The system includes a sensor unit for sensing ethanol in the atmospheric contents of the motor vehicle's interior, for example, a unit for providing an actuation signal in response to the sensing unit, and a signal unit that generates a signal which can be utilized for many purposes, for example, causing at least some of the exterior lights on the motor vehicle to alternately flash on and off in a substantially non-standard pattern. The sensing unit may also be coupled with a digital read-out device or the like to indicate the amount of blood alcohol content of a person for evidentiary or like purposes.

Martin, U.S. Pat. No. 5,055,268 describes an air-borne chemical sensor system including a motor and impeller to draw an air sample into a housing containing a sensor which will provide a signal for display related to the amount of a particular air-borne chemical in a given air sample. The system is controllable by different duration activation of a single activating switch which can further control a secondary function, such as a flashlight.

Phillips, U.S. Pat. No. 5,220,919 describes a gaseous detection system for detecting the existence of a certain gas and further the detection of a certain level or percentage of that certain gas within a certain environment. An example is use of the gas detection system in a motor vehicle to aid in determining when a driver of the motor vehicle may be driving under the influence of alcohol, and for providing an appropriate warning signal that may be viewed from the exterior of the motor vehicle. The system includes a sensor unit for sensing ethanol in the atmospheric contents of the motor vehicle's interior, for example, a unit for providing an actuation signal in response to the sensing unit, and a signal unit that generates a signal which can be utilized for many purposes, for example, causing at least some of the exterior lights on the motor vehicle to alternately flash on and off in a substantially non-standard pattern. The sensing unit may also be coupled with a digital read-out device or the like to indicate the amount of blood alcohol content of a person for evidentiary or like purposes.

Forrester et al., U.S. Pat. No. 5,376,555 describes a method and infrared sensing device for determining the concentration of alveolar alcohol in a breath sample exhaled by a subject into an infrared sensing device. The presence of alcohol from the upper respiratory tract of the subject is detected by continuously monitoring alcohol and carbon dioxide, normalizing alcohol values with respect to carbon dioxide, calculating a difference between normalized alcohol concentration and carbon dioxide concentration over time, integrating (summing) the difference, and comparing the integrated difference with a threshold. This technique accurately and consistently detects the presence of mouth alcohol in the sample before the presence of carbon dioxide which originates in deep lung breath.

Steinberg, U.S. Pat. No. 5,743,349 describes a vehicle ignition interlock system including a non-invasive reader of a person's blood-alcohol concentration in combination with ignition interlock circuitry that prevents operation of a vehicle by an intoxicated person. The non-invasive blood-alcohol concentration reader, termed alcoh-meter, utilizes optical spectroscopic electromagnetic radiation technology to determine the alcohol levels in the blood. The alcoh-meter is preferably a dash mounted sensor for receiving a person's finger and absorbing incident light from a multiple wavelength light source and causing a light absorption reading to be generated based on the person's blood alcohol concentration in the finger tissue. After registering a reading, the results are compared electronically against a table of impaired/non-impaired levels of blood alcohol concentration. The impaired/non-impaired results are communicated to interlock circuitry that either enables, or disables start-up of the vehicle. If an impaired status is determined, the results are displayed instructing the operator to wait, or find a non-impaired operator.

Sohèege et al., U.S. Pat. No. 6,075,444 describes an arrangement for blocking the operation by an intoxicated operator of a machine or a motor vehicle. The arrangement has a measuring apparatus which determines the blood alcohol content of the operator and an evaluation unit connected to the machine or motor vehicle. The evaluation unit receives measurement data supplied by the measurement apparatus and enables the machine or motor vehicle when the measurement data satisfies at least one predetermined condition. The arrangement is improved in that the sobriety of the operator is recognized before the starting operation of the machine or motor vehicle without it being necessary to supply a breath sample. The measuring apparatus includes a gas sensor which is a sensor for measuring the blood alcohol content via permeation through the skin of the operator. The measuring apparatus is configured so that it can be worn by the operator preferably on the leg or arm.

Kaplan, U.S. Pat. No. 6,097,480 describes a vehicle interlock system which utilizes non-invasive, optically based methods for detecting and measuring levels of certain target chemical substances in the blood or tissues of a user in preventing operation of the vehicle by persons exhibiting higher (or lower) than prescribed levels of such chemicals. The system of the present invention is not limited to simply measuring blood alcohol levels as are presently available breathalizer-based interlock systems, but lends itself to use in detecting unacceptable systemic levels of virtually any chemical for which the system if programmed to measure. In addition, the present system includes components for positively identifying, and during the course of vehicle operation, re-identifying the intended user and alcohol or drug user testee.

Kuennecke, U.S. Pat. No. 6,183,418 describes the process for detection and for quantitative determination of substances emitted or perspired through the skin is derived from flow diffusion analysis. The measuring system conceived for this purpose uses a diffusion half cell through which an acceptor medium flows and which is closed by a membrane. For the duration of the measurement, the membrane is brought into contact with the skin or a closed gas volume formed over the skin. With the process and the related measuring system, the blood alcohol level can be determined with a good degree of precision indirectly via the quantity of (gaseous)ethanol emitted through the skin.

Duval, U.S. Pat. No. 6,620,108 describes an apparatus and method for assuring that a machine operator is not under the influence of a chemical, comprising a first sensor positioned proximally to the machine operator and adapted for measuring a vapor concentration proximal thereto, a second sensor positioned distally from the machine operator and adapted for measuring the vapor concentration distally from the operator, a device for comparing the proximal and distal vapor concentrations, and an automated remediation element responsive to the comparing device when the ratio of the first and the second vapor concentrations are within a specified range.

Our prior art search with abstracts described above primarily teaches the use of analyzing vapors produced in the exhalant of an individual and within an enclosed space such as the interior of an automobile. The Duval reference also teaches the use of vapor sensing from the skin of an individual holding a steering wheel. Thus, the prior art shows several solutions to the analysis of vapors and how to collect vapors. However, the prior art fails to teach how such a system may be installed into a vehicle steering wheel to achieve an integrated system. The present solution provides this missing technical approach teaching a novel installation of a gas sensing system and its signal processing.

SUMMARY OF THE INVENTION

The present invention teaches certain benefits in construction and use which give rise to the objectives described below.

A steering wheel has a structural skeleton, typically of metal for rigidity and strength, forming a core within an exterior covering which traditionally is made up of wood or leather covering a foam layer, the skeleton and covering forming a hub portion having at least one arm interconnecting the hub portion with a wheel portion. The skeleton within the wheel portion has a U-shaped cross sectional conformation or shape. A wire harness is positioned within the U-shaped conformation of the skeleton and a plurality of ethanol detectors are likewise mounted in the U-shaped conformation of the skeleton and extend laterally therefrom into the exterior covering so as to terminate flush with the outer surface of the exterior covering. These detectors are in a spaced apart relationship around the steering wheel. The ethanol detectors communicate through the wire harness with an electrical circuit mounted on the hub portion of the skeleton. The detectors sense ethanol vapors given off by the skin of ones hands and trigger a sensing process to calculate blood levels of ethanol of the person handling the steering wheel.

A primary objective of the present invention is to provide an apparatus and method of use of such apparatus that yields advantages not taught by the prior art.

Another objective of the invention is to sense ethanol vapors emitted by the hands of a vehicle operator.

A further objective of the invention is to sense the presence of the hands of a vehicle operator on a steering wheel of the vehicle so as to start a sensing circuit of the vehicle.

A still further objective of the invention is to cause the sensing of ethanol in proximity to a steering wheel of a vehicle to enable a remedial circuit action.

A yet further objective of the invention is to provide a method of converting any steering wheel to a vapor sensing device capable of controlling the use of the associated vehicle.

Other features and advantages of the embodiments of the present invention will become apparent from the following more detailed description, taken in conjunction with the accompanying drawings, which illustrate, by way of example, the principles of at least one of the possible embodiments of the invention.

BRIEF DESCRIPTION OF THE DRAWINGS

The accompanying drawings illustrate at least one of the best mode embodiments of the present invention. In such drawings.

DETAILED DESCRIPTION OF THE INVENTION

Figure 1:
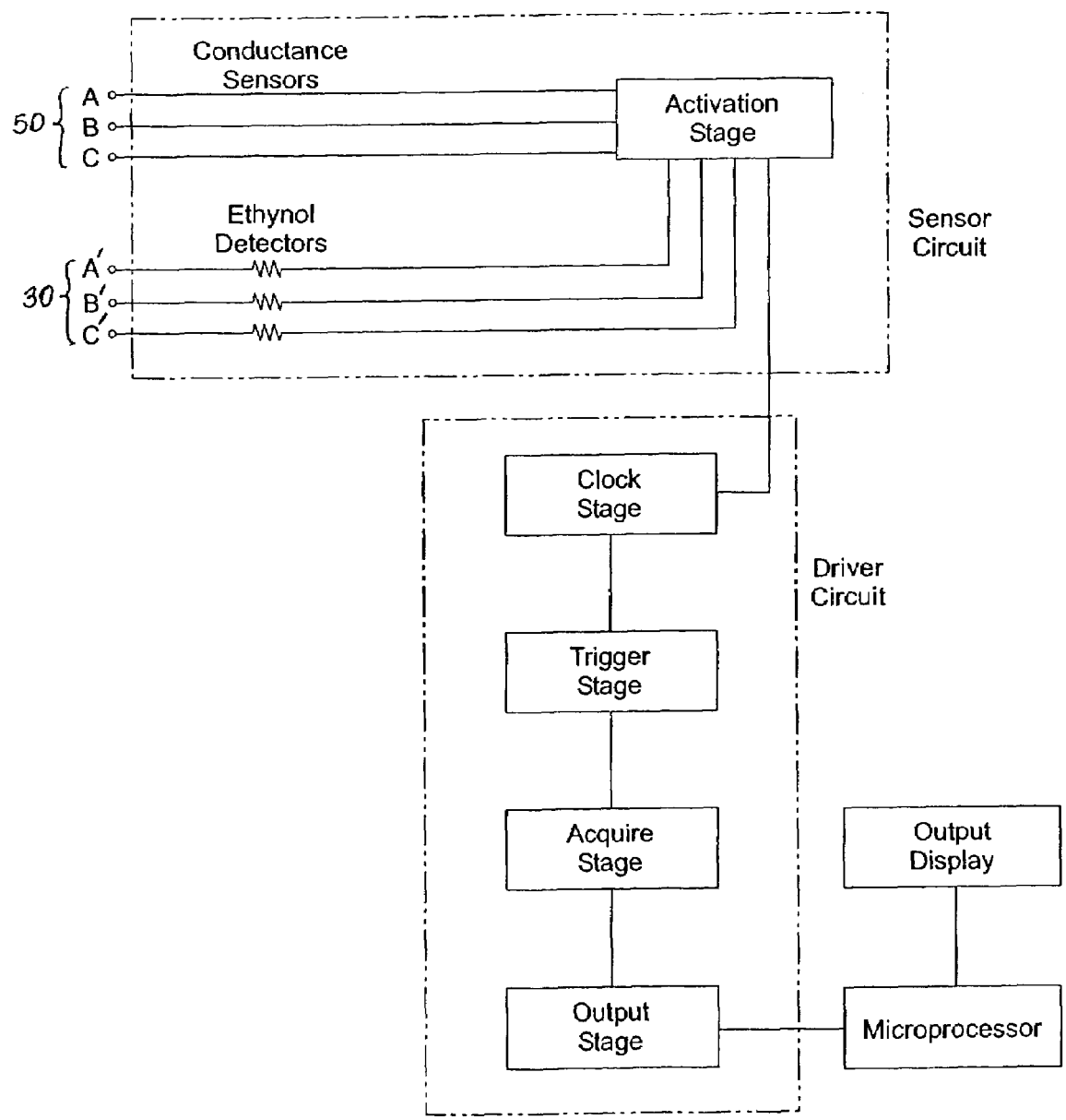
FIG. 1 is an electrical block diagram of the present invention.
Figure 2:
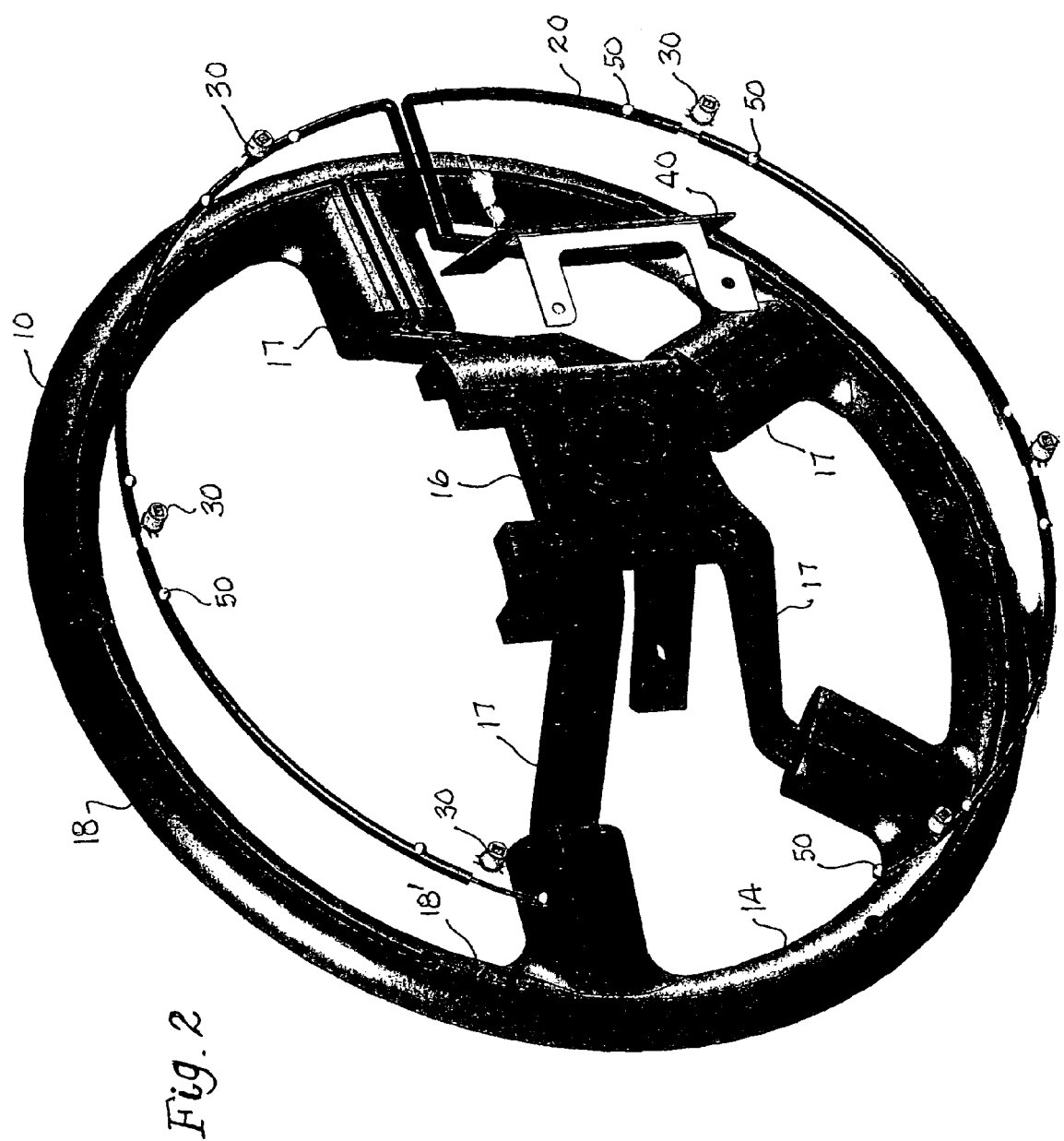
FIG. 2 is a perspective exploded view of one embodiment of the invention showing a relationship between a steering wheel, alcohol detectors, touch sensors, an electronic board capable of processing signals from the detectors and sensors and a wire harness interconnecting the detectors and the sensors with the circuit board.
Figure 3:
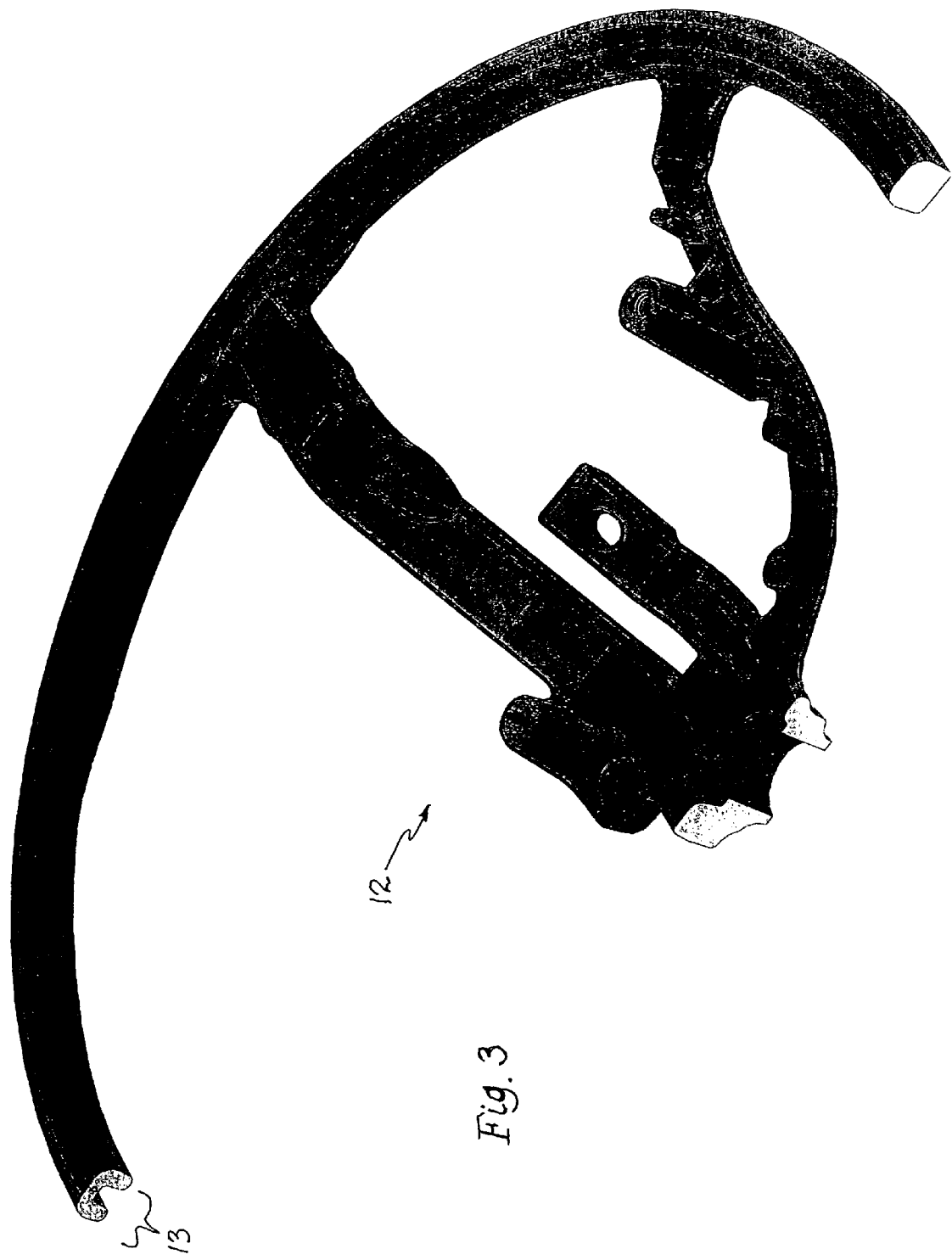
FIG. 3 is a partial perspective view of a skeleton of the steering wheel thereof.
Figure 4:
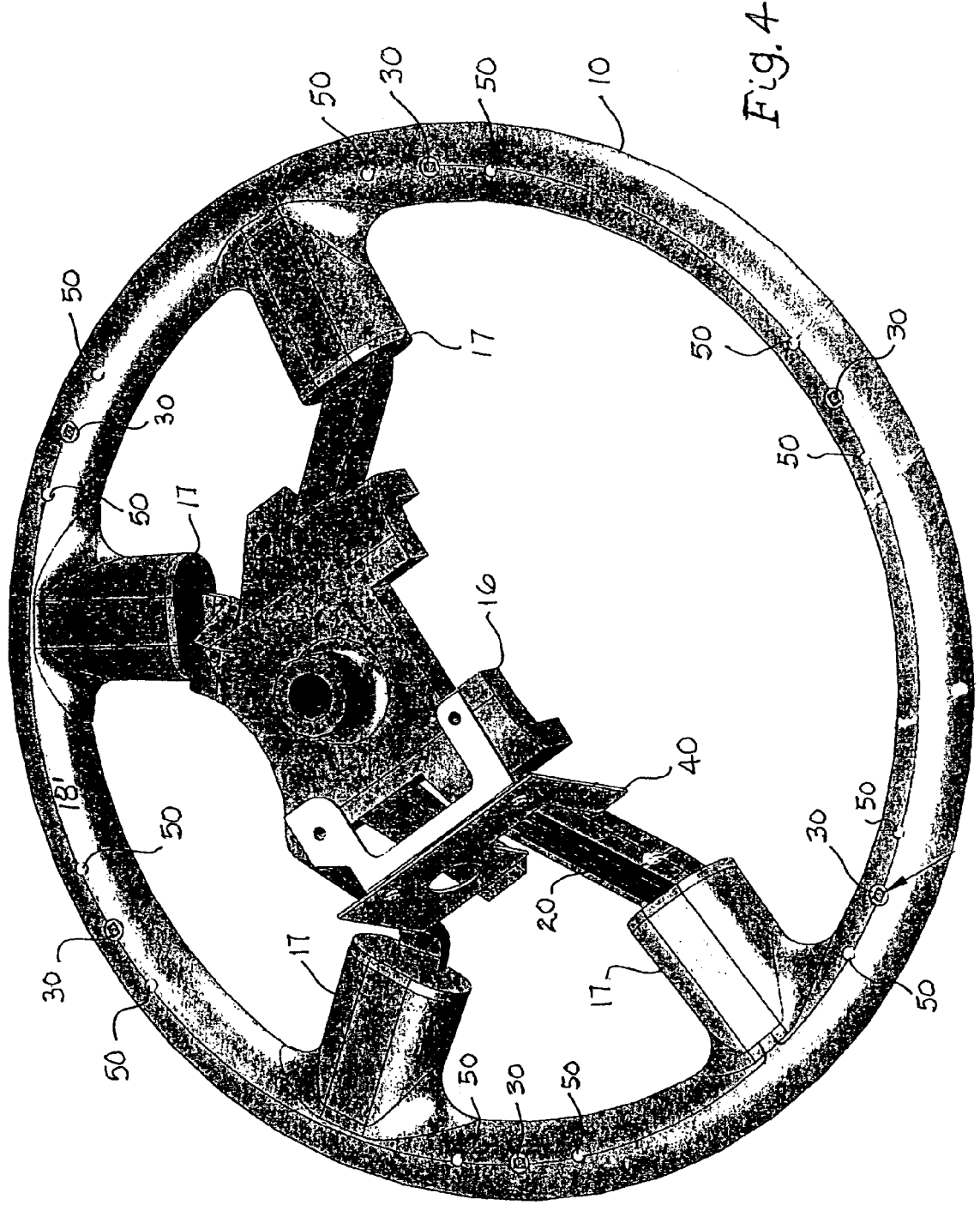
FIG. 4 is a perspective view of the components of FIG. 1 as assembled into a finished unit or assembly.

The above described drawing figures illustrate the present invention in at least one of its preferred, best mode embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

In one embodiment of the present invention a steering wheel 10 of a vehicle (not shown), has a structural skeleton 12 forming an interior core within an outer covering 14. The covering 14 and skeleton 12 form and are configured as a hub portion 16 having one or more arms 17 interconnecting the hub portion 16 with an outer wheel portion 18, and this is well known and in common practice for automobiles and trucks worldwide. The part of the skeleton 12 that is within the outer wheel portion 18 preferably has a U-shaped cross sectional conformation 13, or the conformation may be "J" shaped or similar shapes that are able to perform the intended function as will be described. This common steering wheel is improved by the present invention by the addition of a wire harness 20, i.e., a collection of individual conductive wires or a cable with plural conductors bundled together, which is positioned within the U-shaped conformation of the skeleton of the outer wheel portion 18.

In this manner, the wire harness 20 takes up no more room than that which is already offered by the steering wheel 10. Additionally, the harness is protected by being mainly surrounded by the skeleton, a rigid structural member.

A plurality of ethanol detectors 30 are mounted in spaced apart relationship within the outer wheel portion 18 and are placed adjacent to an outer surface 18' thereof. In this description the word "detectors" shall refer to two or more detectors. Likewise, the use of the words "ethanol detectors 30" shall refer specifically to devices for detecting ethyl alcohol vapor. Therefore, sensing in this invention refers to sensing airborne or agents on the skin or clothing, that can be sensed by electronic or electro-chemical means, or alternative detection means.

The ethanol detectors 30 communicate using electrical signals with the wire harness 20; and thereby with an electrical circuit 40, the circuit 40 is engaged or mounted onto the hub portion 16 of the skeleton 12. The detection of ethyl alcohol by any one or more of the detectors 30 is thus able to be functionally processed by the circuit 40 in a manner to be described.

Preferably, the present invention further comprises a plurality of contact sensors 50 mounted in spaced apart relationship with the ethanol detectors 30 and in adjacency to the outer surface 18' of the outer wheel portion 18. Preferably, the ethanol detectors 30 and the contact sensors 50 are positioned on a rearwardly facing portion 18' of the outer surface 18 of the steering wheel 10. The contact sensors 50 are enabled for sensing contact with a skin surface of a hand that is gripping the steering wheel 10 and thereby enables a contact electrical signal to the circuit 40 so that a signal from a corresponding one of the ethanol detectors 30 is able to be accepted by the circuit and processed.

In a further embodiment of the present invention a method of preparing the vapor sensing system comprises providing the steering wheel 10 with the structural skeleton as a core within an outer covering, configuring the steering wheel as the hub portion with the arms interconnecting the hub portion with the outer wheel portion, configuring the skeleton within the outer wheel portion with the U-shaped cross sectional conformation, placing the wire harness within the U-shaped conformation of the outer wheel portion; placing a plurality of ethanol detectors in cavities in the outer wheel portion in spaced apart relationship and adjacent to an outer surface thereof, interconnecting the ethanol detectors for communicating with the electrical circuit through the wire harness; and engaging the circuit with the hub portion of the skeleton for sensing ethanol vapors in proximity to at least one of the ethanol detectors.

This method preferably further comprises the step of placing the plurality of contact sensors 50 in spaced apart relationship with the ethanol detectors 30 and both in adjacency to the outer surface of the outer wheel portion.

The method preferably further comprises the step of positioning the ethanol detectors 30 and the contact sensors 50 in the rearwardly facing portion of the outer surface of the steering wheel.

The method preferably further comprises the step of enabling the contact sensors 50 for sensing contact with the skin surface of a hand and for thereby enabling an electrical signal of a corresponding one of the ethanol detectors 30 to be processed by the circuit 40.

Referring now to FIG. 1, the preferred enablement of the circuit 40 of the present apparatus includes an Activation Stage electrical circuit enabled by the wire harness 20 for receiving signals from the vapor detectors 30 and the contact sensors 50. When a touch contact signal from one of the contact sensors 50 is received at the Activation Stage, the Activation Stage opens a patch for receiving a signal from the corresponding detector 30. Such a patch is considered to be a routine and well known electrical circuit enablement. The sensors 50 are in such close proximity to their respective detectors 30, that a brush contact of skin against one of the sensors 50 (A, B, C in FIG. 1) is a good indicator that a vapor sample is being received by the respective detector 30 (A', B', C' in FIG. 1). In this manner, the Activation Stage is able to discriminate as to which detector signal to process and does not process signals from the other detectors 30 which, if they are not sampling vapor would provide a false indication. This apparatus and method therefore prevents false signal processing. It should be understood that the sensors 50 may be incorporated within the detectors 30 or may use the outer case of the detectors 30 as the sensor 50. This portion of the circuit is considered to be a routine and well known electrical circuit enablement.

Once a detector signal is received and admitted for processing by the Activation Stage, a Clock Stage electrical circuit (timer) is initiated by a signal from the Activation Stage and, being previously programmed for a specific time duration continues to run its timing cycle until completed; typically from 2 to 5 seconds. This is the range of time duration that is required to acquire a satisfactory vapor detection signal at the detector 30 which is being sensed. This portion of the circuit is considered to be a routine and well known electrical circuit enablement. Once the timing cycle is completed, a Trigger Stage electrical circuit switches an Acquire Stage electrical circuit to an "on" state so that the incoming signal from the detector 30 is received at the Acquire Stage electrical circuit which then communicates the detection signal to an Output Stage electrical circuit. This portion of the circuit is considered to be a routine and well known electrical circuit enablement.

The Output Stage provides a digital signal corresponding to the magnitude of the output of the detector 30 to a Microprocessor functional as an ignition interlock device and enabled by its program for calculating a blood alcohol level percentage corresponding to the signal magnitude from the vapor detector 30. This Microprocessor may be placed as part of the Driver Circuit or may be separate and distant from the Driver Circuit as shown in FIG. 1. The Microprocessor provides an output to an Output Display for presenting a visual image of the calculated BAC percentage so that the operator of the vehicle or other equipment is able to know the alcohol content of his/her blood. This portion of the circuit is considered to be a routine and well known electrical circuit enablement.

The enablements described in detail above are considered novel over the prior art of record and are considered critical to the operation of at least one aspect of one best mode embodiment of the instant invention and to the achievement of the above described objectives. Although each stage of the circuit of FIG. 1 is considered to be well known and routine, the assembly of the described elements, as shown in FIG. 1, is considered to be a novel enablement.

The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. In a steering wheel of a vehicle, wherein the steering wheel has a structural skeleton forming a core within an outer covering, the covering and skeleton forming (a) a hub, portion having at least (b) one arm interconnecting the hub portion with an (c) outer wheel portion; the improvement comprising; the skeleton within the outer wheel portion having a U-shaped cross sectional conformation; a wire harness positioned within the U-shaped conformation of the outer wheel portion; a plurality of separate ethanol detectors mounted in spaced apart relationship within the outer wheel portion and adjacent to an outer surface thereof, the ethanol detectors communicating with the wire harness; and an electrical circuit, the circuit secured in the hub portion; the circuit joined in communication with the wire harness for receiving electrical signals from the ethanol detectors for sensing ethanol vapors in proximity to at least one of the ethanol detectors.

2. The apparatus of claim 1 further comprising a plurality of contact sensors mounted in spaced apart relationship with the ethanol detectors and in adjacency to the outer surface of the outer wheel portion.

3. The apparatus of claim 2 wherein the ethanol detectors and the contact sensors are positioned on a rearwardly facing portion of the outer covering of the steering wheel.

4. The apparatus of claim 2 wherein the contact sensors are enabled for sensing contact with a skin surface of a hand and for thereby enabling an electrical signal of a corresponding one of the ethanol detectors to be processed by the electrical circuit.

5. A vapor sensing system comprising: a steering wheel of a vehicle, wherein the steering wheel has a structural skeleton forming a core within an outer covering, the covering and skeleton forming (a) a hub portion having at least (b) one arm interconnecting the hub portion with an (c) outer wheel portion; the skeleton within the outer wheel portion having a U-shaped cross sectional conformation; a wire harness positioned within the U-shaped conformation of the outer wheel portion; a plurality of ethanol detectors mounted in spaced apart relationship within the outer wheel portion and adjacent to an outer surface thereof, the ethanol detectors communicating with the wire harness; and an electrical circuit, the circuit engaged with the hub portion of the skeleton; the electrical circuit in communication with the wire harness for receiving electrical signals from the ethanol detectors for sensing ethanol vapors in proximity to at least one of the ethanol detectors; a plurality of contact sensors mounted in spaced apart relationship with the ethanol detectors and in adjacency to the outer covering of the outer wheel portion, wherein the contact sensors are enabled for sensing contact with a skin surface of a hand and for thereby enabling an electrical signal of a corresponding one of the ethanol detectors to be processed by the circuit.

6. An apparatus for processing signals generated by a vapor detector comprising: a plurality of ethanol detectors mounted in a steering wheel; an activation electrical circuit stage enabled for receiving signals from the ethanol detectors when a touch contact signal is received by the activation stage; a clock electrical circuit stage initiated by a signal from the activation stage and programmed for a specific delay time; a trigger electrical circuit stage switching to an "on" state when the activation signal is present; an acquire electrical circuit stage providing a signal to an output stage when the trigger stage is in the "on" state, the output stage providing a digital signal to a microprocessor functional as an ignition interlock device and enabled for calculating a blood alcohol level percentage corresponding to a signal magnitude of the signals from the ethanol detector, and an output display for presenting a visual image of said calculated percentage.

* * * * *